(12) United States Patent
Liu et al.

(10) Patent No.: US 11,817,556 B2
(45) Date of Patent: Nov. 14, 2023

(54) COMPOSITE GEL POLYMER ELECTROLYTE LITHIUM BATTERY STRUCTURE AND METHOD OF FABRICATING THE SAME

(71) Applicant: Institute of Nuclear Energy Research, Atomic Energy Council, Executive Yuan, R.O.C, Taoyuan (TW)

(72) Inventors: Shang-En Liu, Taoyuan (TW); Tien-Hsiang Hsueh, Taoyuan (TW); Min-Chuan Wang, Taoyuan (TW)

(73) Assignee: INSTITUTE OF NUCLEAR ENERGY RESEARCH, ATOMIC ENERGY COUNCIL, EXECUTIVE YUAN, R.O.C, Taoyuan (TW)

( * ) Notice: Subject to any disclaimer, the term of this patent is extended or adjusted under 35 U.S.C. 154(b) by 21 days.

(21) Appl. No.: 17/683,425

(22) Filed: Mar. 1, 2022

(65) Prior Publication Data
US 2023/0133962 A1    May 4, 2023

(30) Foreign Application Priority Data
Nov. 1, 2021 (TW) .................. 110140508

(51) Int. Cl.
H01M 10/0565 (2010.01)
H01M 10/058 (2010.01)

(52) U.S. Cl.
CPC ..... H01M 10/0565 (2013.01); H01M 10/058 (2013.01); H01M 2300/0091 (2013.01)

(58) Field of Classification Search
CPC .......... H01M 10/0565; H01M 10/058; H01M 2300/0091; Y02E 60/10; Y02P 70/50
See application file for complete search history.

(56) References Cited

FOREIGN PATENT DOCUMENTS

| JP | 3570655 | * | 9/1998 | ............... H01M 6/22 |
| JP | 1507102 | * | 6/2004 | ............ H01M 10/04 |
| JP | 2004-172346 | * | 8/2004 | ............. H01G 9/025 |

* cited by examiner

*Primary Examiner* — Helen Oi K Conley
(74) *Attorney, Agent, or Firm* — Locke Lord LLP; Tim Tingkang Xia, Esq.

(57) ABSTRACT

A composite gel polymer electrolyte lithium battery structure includes a positive electrode, a negative electrode and an electrolyte film component. The electrolyte film component, disposed between the positive electrode and the negative electrode, includes a separator and at least one electrolyte film. The at least one electrolyte film is at least consisted of sulfolane and/or propylene carbonate (PC), a lithium salt material, a solid-state polymer material and fire-retardant additives. In addition, a method for fabricating the composite gel polymer electrolyte lithium battery structure is also provided.

13 Claims, 6 Drawing Sheets

COMPOSITE GEL POLYMER ELECTROLYTE LITHIUM BATTERY STRUCTURE AND METHOD OF FABRICATING THE SAME

CROSS REFERENCE TO RELATED APPLICATION

This application claims the benefits of Taiwan application Serial No. 110140508, filed Nov. 1, 2021, the disclosures of which are incorporated by references herein in its entirety.

TECHNICAL FIELD

The present disclosure relates in general to a composite gel polymer electrolyte lithium battery structure and method, and more particularly to the composite gel polymer electrolyte lithium battery structure and method that can integrate a separator and a gel polymer state electrolyte to enhance mechanical strength and safety of the battery, and to reduce production cost thereof.

BACKGROUND

With advancement in technology and discovery of new materials, versatile types of batteries have been developed. Further, with the advent of portable electronic devices such as mobile phones and notebook computers, a demand for smaller and lighter batteries for these portable electronic devices becomes more significantly. Thus, to meet this demand, lithium-ion batteries have gradually attracted people's attention and been also widely used, due to their high energy density and rapid charging capabilities.

In electrochemical components such as batteries, secondary batteries and capacitors, liquid electrolytes are mostly used as conductive materials for manufacturing new batteries. However, beside the risk of leakage, the liquid electrolytes are also lack of long-term stability, easy to corrode, flammable, poor safety and low reliability, etc. Thus, the aforesaid liquid electrolyte cannot fully meet the safety requirements of large-scale industrial energy storage.

Nevertheless, it is found that a gel polymer state electrolyte is a substitute for the conventional liquid electrolyte. Though the gel polymer state electrolyte with high ionic conductivity and stability has been developed, yet, while in the stage of pilot production, it is often found that the gel polymer electrolyte cannot be well prepared on the existing packaging machine in the battery cell factory. As a result, the packaging of the gel polymer state electrolyte can only be done manually. However, a modification of the packaging machine redesigned specifically for mass production would increase significantly the production cost of the gel polymer state electrolyte, at least in the stage of pilot production. As such, the introduction of such a modification usually form a bottleneck to the mass production of the gel polymer state electrolyte lithium batteries.

In addition, the current packaging methods used in the battery cell factory are provided specifically to the liquid electrolytes. While in packaging the lithium battery, the settings of the packaging machine are usually prepared to meet the mechanical strength of the electrolyte separator used for lithium batteries. However, since the mechanical strength of the current gel polymer state electrolyte is lower than that of the separator, thus the conventional machine settings are hardly applied to package successfully the liquid electrolyte. However, if the gel polymer state electrolyte is directly used on the conventional packaging machine for the liquid electrolytes, the resulted gel polymer state electrolyte may be broken or damaged. Therefore, prior to the mass production of the gel polymer state electrolyte lithium batteries, it is necessary to redesign the packaging machine specifically for the gel polymer state electrolyte lithium batteries. As such, it is inevitable to result in a substantial increase in the cost of the early-stage mass production.

Accordingly, how to develop a "composite gel polymer electrolyte lithium battery structure and method" that can integrate a separator and a gel polymer state electrolyte so as to improve the mechanical strength and safety of the battery and thus reduce production costs is an urgent need for the skills in the art.

SUMMARY

In one embodiment of this disclosure, a composite gel polymer electrolyte lithium battery structure includes:
- a positive electrode;
- a negative electrode; and
- an electrolyte film component, including a separator and at least one electrolyte film, disposed between the positive electrode and the negative electrode, the electrolyte film being at least consisted of sulfolane and/or propylene carbonate (PC), a lithium salt material, a solid-state polymer material and fire-retardant additives.

In another embodiment of this disclosure, a method for fabricating a composite gel polymer electrolyte lithium battery structure, includes the steps of:
(a) providing at least one electrolyte film, wherein the at least one electrolyte film is consisted of sulfolane and/or propylene carbonate (PC), a lithium salt material, a solid-state polymer material and fire-retardant additives;
(b) adhering a separator to the at least one electrolyte film so as to form an electrolyte film component; and
(c) infiltrating electrolytes of the at least one electrolyte film into the separator till the separator is turned into a transparent state, and then adhering a positive electrode and a negative electrode onto two opposite surfaces of the electrolyte film component, respectively.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
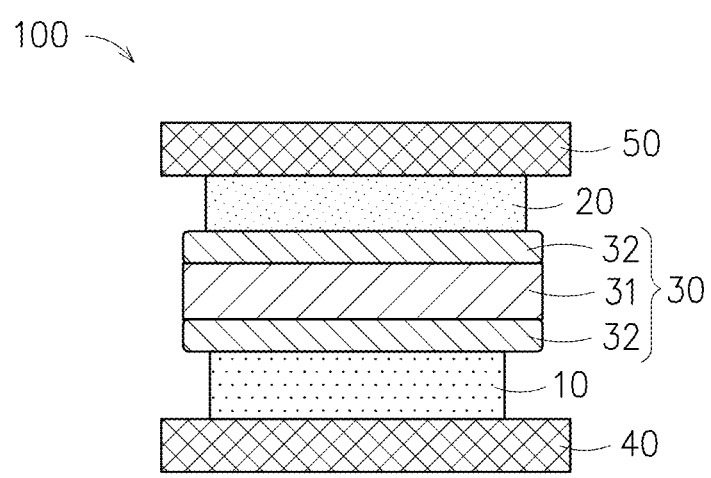
FIG. 1 is a schematic cross-sectional view of an embodiment of the composite gel polymer electrolyte lithium battery structure in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Referring to FIG. 1, a composite gel polymer electrolyte lithium battery structure 100 includes a positive electrode 10, a negative electrode 20, an electrolyte film component 30, a bottom cover 40 and a top cover 50.

The top cover 50 and the bottom cover 40 are disposed oppositely and outside of the positive electrode 10 and the negative electrode 20, respectively. Namely, the positive electrode 10, the electrolyte film component 30 and the negative electrode 20 are sandwiched between the top cover 50 and the bottom cover 40.

Purposes of the bottom cover 40 and the top cover 50 are to shield the positive electrode 10 and the negative electrode 20, respectively.

The bottom cover 40, as a bottom plate of the battery (for example, a coin cell), can be made of stainless steel.

The top cover 50, consisted of a top plate, a pad and a spring plate of the battery (for example, a coin cell), can be made of stainless steel.

The positive electrode 10 can be made of one or a combination of $LiCo_xNi_yMn_zO_2$ (NCM), $LiFePO_4$, $LiCoO_2$, $LiMn_2O_4$, $LiNiCoAlO_2$ and $Li_xS_y$.

The negative electrode 20 can be made of one or a combination of Li, meso-carbon microbeads (MCMB), carbon nanotube (CNT), graphene, silicon/graphite composite, graphite and $Li_4Ti_5O_{12}$.

The electrolyte film component 30, disposed between the positive electrode 10 and the negative electrode 20, includes a separator 31 and two electrolyte films 32 individually attached to opposite surfaces of the same separator 31.

The separator 31 can be made of one or a combination of hydrophilic polyvinylidene fluoride (PVDF), polyethylene (PE), polypropylene (PP), polystyrene (PS), polymethyl methacrylate (PMMA), polyvinyl chloride (PVC) and polycarbonate (PC).

The electrolyte film 32 is consisted of sulfolane and/or propylene carbonate (PC), a lithium salt material, a solid-state polymer material and fire-retardant additives.

Figure 2:
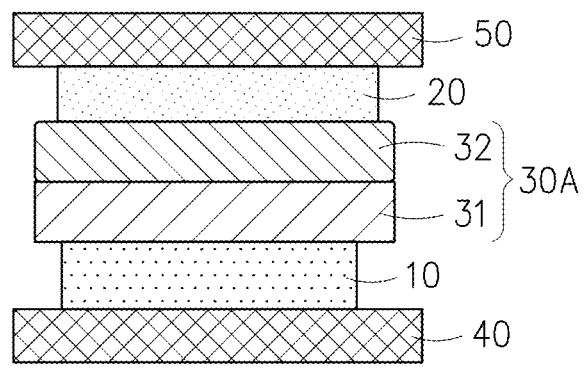
FIG. 2 is a schematic cross-sectional view of another embodiment of the composite gel polymer electrolyte lithium battery structure in accordance with this disclosure.

Referring to FIG. 2, a composite gel polymer electrolyte lithium battery structure 100A includes a positive electrode 10, a negative electrode 20, an electrolyte film component 30A, a bottom cover 40 and a top cover 50. The top cover 50 and the bottom cover 40 are disposed oppositely outside to the positive electrode 10 and the negative electrode 20, respectively, so as to sandwich thereinside the positive electrode 10, the electrolyte film component 30A and the negative electrode 20.

The difference between the embodiment of FIG. 2 and that of FIG. 1 is mainly that the electrolyte film component 30A of this embodiment is formed by adhering a separator 31 and an electrolyte film 32. The electrolyte film component 30A is disposed between the positive electrode 10 and the negative electrode 20, by having the positive electrode 10 to adhere the separator 31, and the negative electrode 20 to adhere the electrolyte film 32.

Figure 3:
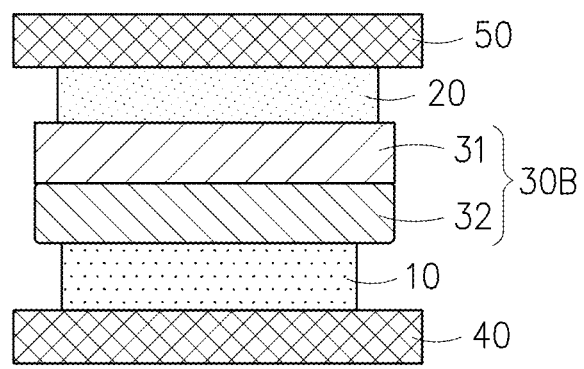
FIG. 3 is a schematic cross-sectional view of a further embodiment of the composite gel polymer electrolyte lithium battery structure in accordance with this disclosure.

Referring to FIG. 3, a composite gel polymer electrolyte lithium battery structure 100B includes a positive electrode 10, a negative electrode 20, an electrolyte film component 30B, a bottom cover 40 and a top cover 50. The top cover 50 and the bottom cover 40 are disposed oppositely and exterior to the positive electrode 10 and the negative electrode 20, respectively, so as to sandwich thereof in between the positive electrode 10, the electrolyte film component 30B and the negative electrode 20.

The electrolyte film component 30B, consisted of a separator 31 and an electrolyte film 32 adhering to each other, is disposed between the positive electrode 10 and the negative electrode 20. The difference between the embodiment of FIG. 3 and that of FIG. 2 is that, in this embodiment, the positive electrode 10 is adhered to the electrolyte film 32, and the negative electrode 20 is adhered to the separator 31.

From FIG. 1 to FIG. 3, different embodiments of the composite gel polymer electrolyte lithium battery structure are provided with different aspects in the separator and the electrolyte film of the electrolyte film component.

Figure 4:
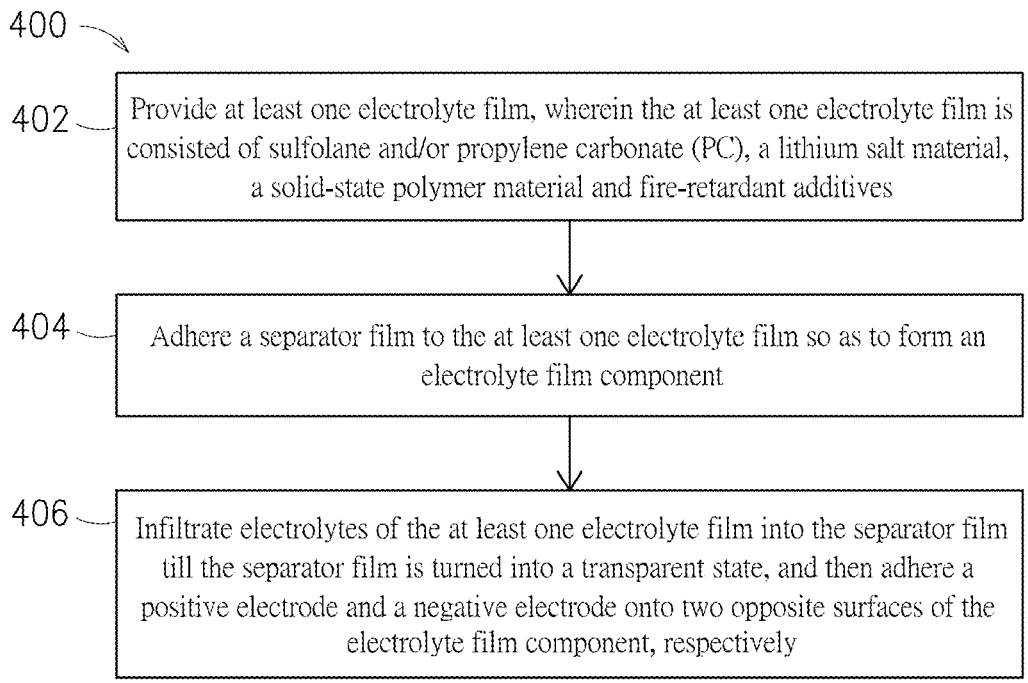
FIG. 4 demonstrates schematically a flowchart of the method for fabricating a composite gel polymer electrolyte lithium battery structure in accordance with this disclosure.

Referring to FIG. 4, a method 400 for fabricating a composite gel polymer electrolyte lithium battery structure includes Steps 402~406.

Step 402: Provide at least one electrolyte film, in which the electrolyte film is consisted of sulfolane and/or propylene carbonate (PC), a lithium salt material, a solid-state polymer material and fire-retardant additives.

Step 404: Adhere a separator to the at least one electrolyte film so as to form an electrolyte film component. In this step, the aspect of the electrolyte film component can be various, such as the embodiment of FIG. 1 whose electrolyte film component 30 includes a separator 31 adhered oppositely with two electrolyte films 32, or the embodiment of FIG. 2 or FIG. 3 whose electrolyte film component 30A or 30B is formed by adhering a separator 31 onto an electrolyte film 32.

Step 406: Infiltrate electrolytes of the electrolyte film into the separator till the separator is turned into a transparent state, and then a positive electrode and a negative electrode are adhered onto two opposite surfaces of the electrolyte film component. As shown in FIG. 1 to FIG. 3, the positive electrode 10 and the negative electrode 20 are individually adhered to the opposite surfaces of the electrolyte film component 30, 30A or 30B, such that the electrolyte film component 30, 30A or 30B can be disposed between the positive electrode 10 and the negative electrode 20.

Figure 5:
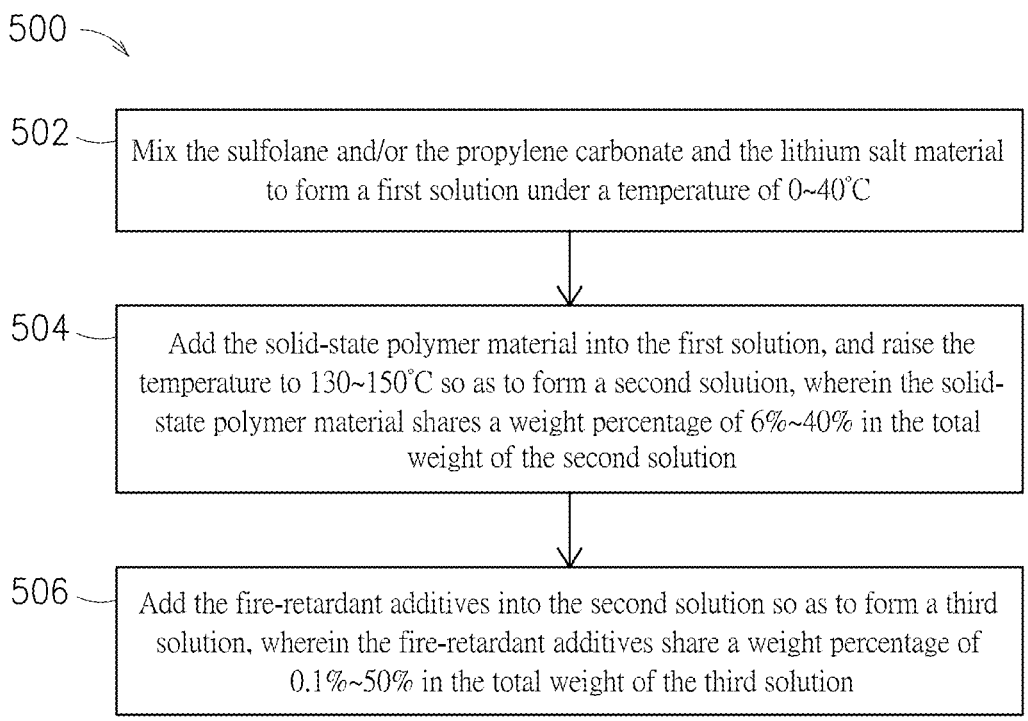
FIG. 5 demonstrates schematically a flowchart of the method for fabricating the electrolyte film in accordance with this disclosure.

In Step 402, the electrolyte film is consisted of sulfolane and/or propylene carbonate (PC), a lithium salt material, a solid-state polymer material and fire-retardant additives, and the method for fabricating the electrolyte film can be referred to the flowchart 500 of FIG. 5 including Steps 502~506.

Step 502: The sulfolane and/or the propylene carbonate and the lithium salt material are mixed to form a first solution under a temperature of 0~40° C. The sulfolane and the propylene carbonate can be mixed firstly at any percentage of 0%~100% into a solution. Then, this solution is further mixed with the lithium salt material in a predetermined temperature, preferably 25° C. The sulfolane and/or the propylene carbonate can share a weight percentage of 90%~50% in the total solution weight, while the lithium salt material shares a weight percentage of 5%~20% in the total solution weight.

The lithium salt material can be made of one or a combination of lithium perchlorate ($LiClO_4$), lithium bis(oxalate) borate (LiBOB), lithium tetrafluoroborate ($LiBF_4$), bis(trifluoromethane) sulfonimide lithium salt (LiTFSI) and lithium bis(fluorosulfonyl) imide (LiFSI).

Step 504: The solid-state polymer material is then added into the first solution, and the temperature is raised to a temperature of 130~150° C. so as to form a second solution, in which the solid-state polymer material shares a weight percentage of 6%~40% in the total weight of the second solution. In this embodiment, the solid-state polymer material can be polyacrylonitrile (PAN)

Step 506: The fire-retardant additives are added into the second solution so as to form a third solution, in which the fire-retardant additives share a weight percentage of 0.1%~50% in the total weight of the third solution.

In this embodiment, the fire-retardant additives can be one or a combination of silicon oxide, lithium-containing sulfur oxide, lithium-containing sulfur tin oxide, lithium-containing sulfide, lithium-containing oxide, trimethyl phosphate (TMP), trimethyl phosphite (TMPI) and a core-shell metal oxide. The core-shell metal oxide for the fire-retardant additives may have a particle size of 10 nm~1 μm. The fire-retardant additives is to provide the gel polymer state electrolyte with an anti-fire ability.

In Step 506, the well-mixed third solution of the gel polymer state electrolyte is a viscous fluid while in heat stirring. In 150° C., the viscous fluid has a viscosity over 3.5 Pa·s. If the temperature is lowered to a room temperature of 0~40° C., then the gel polymer state electrolyte would present a solid state. With these phase-change characteristics, a forming process can be applied to the sticky solution of the gel polymer state electrolyte.

The forming process can be a slot die coating process on a roll-to-roll film-forming machine. In the slot die coating process, the sticky gel polymer state electrolyte is coated onto a base film under a temperature above 130° C. so as to form at least one roll of the electrolyte film. The scraper can be adjusted to produce the electrolyte film with a thickness of 30~200 μm.

The base film can be a PET film (or said PETE film, i.e., a Polyethylene terephthalate film), a separator, or a positive or negative electrode plate of the battery. After the slot die coating process, the electrolyte film would be well prepared. After the electrolyte film is formed on the PET film, the electrolyte film can be peered from the PET film, and then applied to fabricate the battery by the method of FIG. 4, including Steps 402~406.

If the electrolyte film is formed on the separator, then, referring to FIG. 1, the electrolyte film component 30 can be formed by adhering two electrolyte films 32 to the two opposite surfaces of the separator 31; or, referring to FIG. 2 or FIG. 3, the electrolyte film component 30A or 30B can be formed by the separator 31 and the electrolyte film 32 formed thereon.

Figure 6:
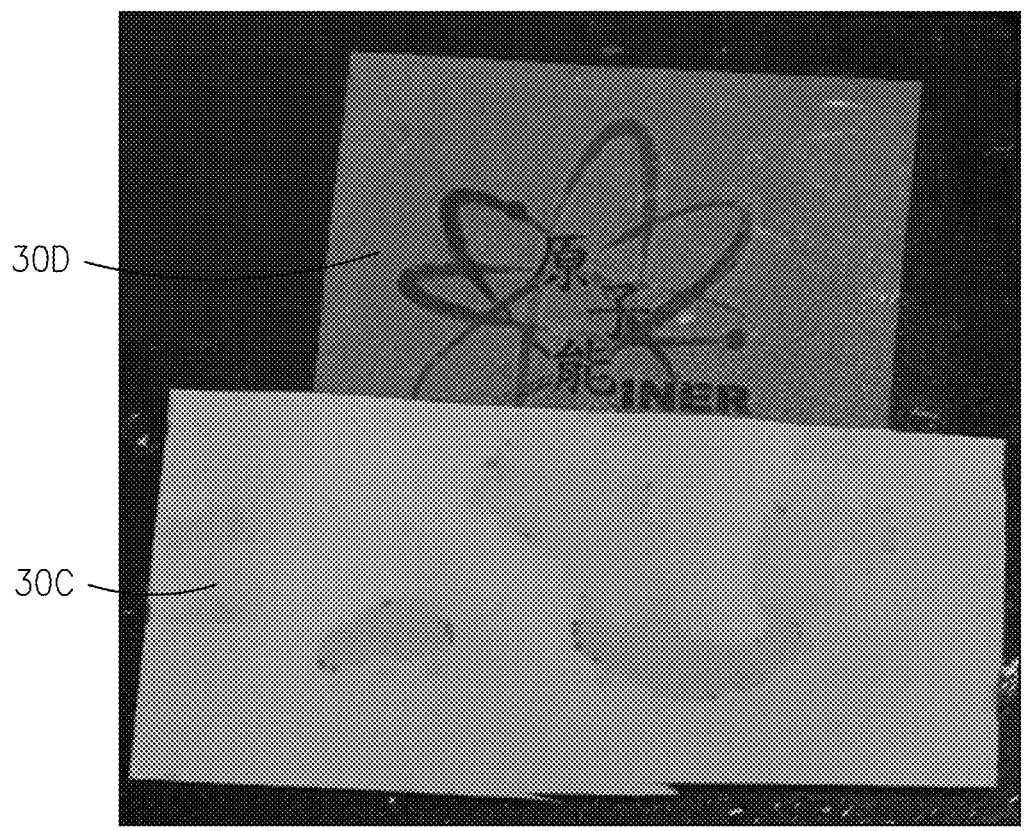
FIG. 6 shows schematically appearances of the embodiment of FIG. 1 before and after infiltration of the electrolyte.

After the separator and the electrolyte film are adhered together to form the electrolyte film component, the combination can be stood still or heated to have the electrolytes of the electrolyte film to infiltrate the separator. Till the surface of the separator to demonstrate transparency, the adhesion of the positive electrode and the negative electrode can be then performed. Referring to FIG. 6, the separator of the electrolyte film component 30C demonstrates a state before the infiltration where the separator is presented to be a white non-transparent film, while the separator of the electrolyte film component 30D demonstrates a state after the infiltration where the separator is presented to be a transparent film, and thus the pattern behind the separator becomes visible.

After the steps of FIG. 4 are finished, a bottom cover and a top cover are individually disposed to the exterior sides of the positive electrode and the negative electrode, respectively, so as to collect the positive electrode, the electrolyte film component and the negative electrode between the top cover and the bottom cover. Thereupon, the composite gel polymer electrolyte lithium battery structures 100, 100A, 100B of FIG. 1~FIG. 3 can be provided.

By having FIG. 1 as an example, the composite gel polymer state electrolyte lithium battery of this disclosure, containing the separator, has various advantages as follows. Firstly, the safety of the battery can be enhanced. In the literature, the separator made of polyethylene, polypropylene and other materials would lose porosity due to thermal expansion, and thereby the associated ion transmission will be blocked. Secondly, after the electrolyte film and the separator are adhered together, such a combination would be applicable to the current packaging line of the liquid electrolyte, and can speed up the pilot production of the gel polymer state electrolyte lithium battery so as to improve the production of the gel polymer state lithium battery and the efficiency of the associated battery testing.

Figure 7:
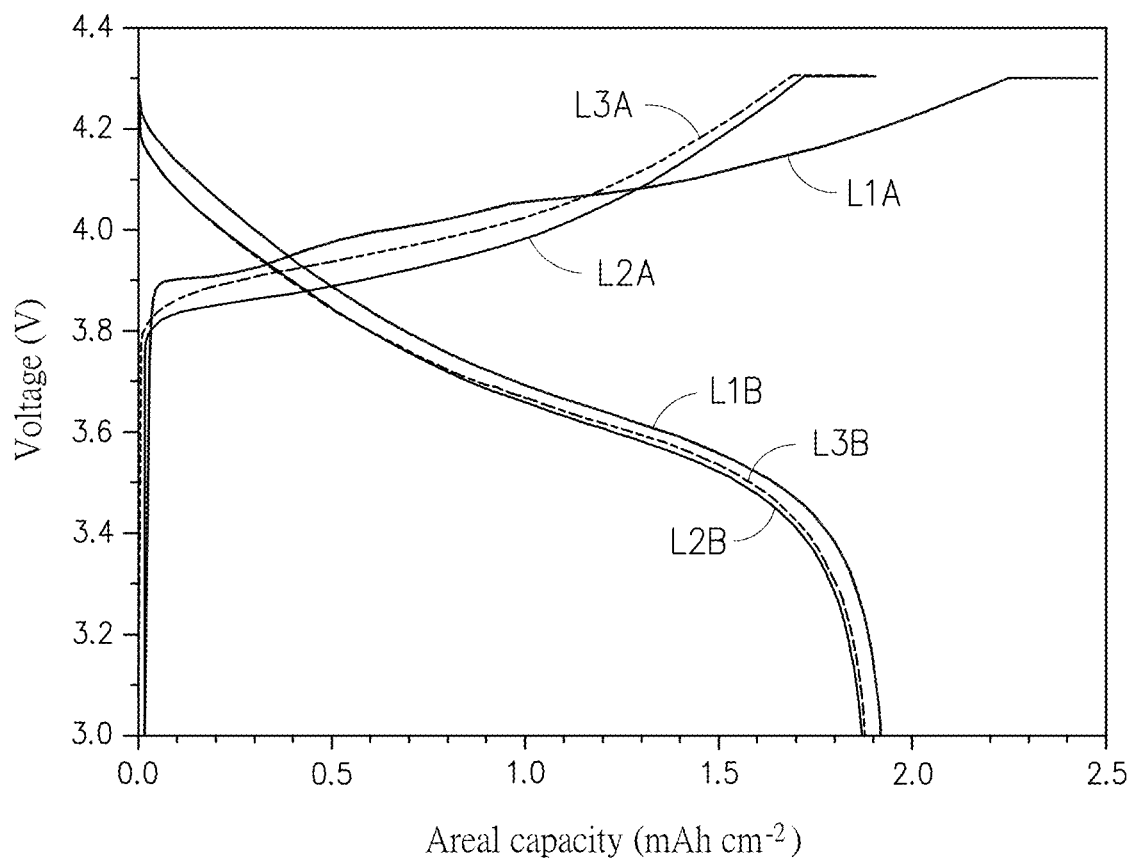
FIG. 7 illustrates schematically results of charge/discharge tests upon the embodiment of FIG. 1.

Referring to FIG. 7, results of charge/discharge tests upon the embodiment of the composite gel polymer electrolyte lithium battery structure 100 in FIG. 1 are illustrated schematically. As shown, curves L1A, L1B stand for the first cycle, curves L2A, L2B stand for the second cycle, and curves L3A, L3B stand for the third cycle.

Figure 8:
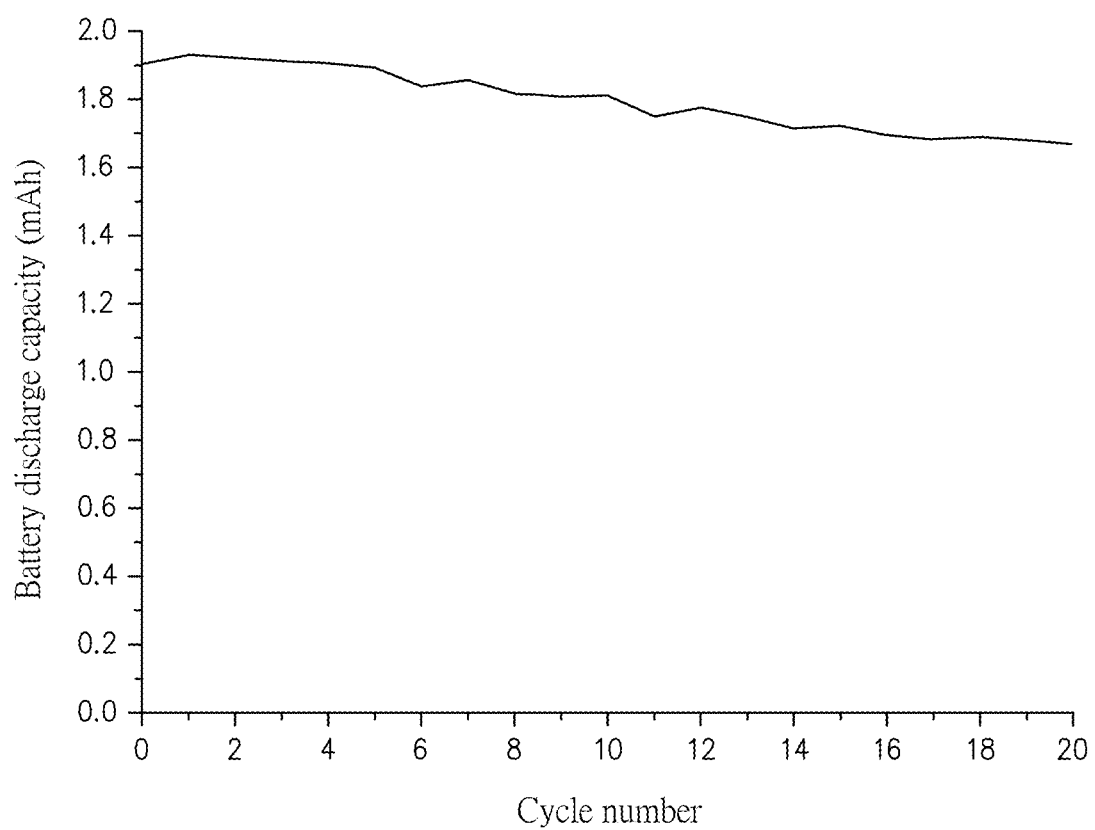
FIG. 8 shows schematically battery discharge capacities with respect to cycle numbers for the embodiment of FIG. 1.

Referring to FIG. 8, battery discharge capacities with respect to cycle numbers for the embodiment of FIG. 1 are shown schematically. After 20 electrical charge-discharge cycles, the battery capacity retention rate would be still high at 87%.

From FIG. 7 and FIG. 8, it is understood through plenty of charge-discharge testing that the composite gel polymer electrolyte lithium battery structure provided in this disclosure can be normally charged and discharged. Thirdly, the structure provided by this disclosure can be applied to the existing packaging machine of the lithium batteries and cells. Namely, no machine modification is required for the existing packaging machine to process the production of the gel polymer state electrolyte lithium battery.

In summary, the composite gel polymer electrolyte lithium battery structure and method provided in this disclosure utilizes the assembly of the separator and the gel polymer state electrolyte to increase the mechanical strength of the gel polymer state electrolyte, and thus to satisfy the packaging requirements in mechanical strength for the current battery cell factory. The structure of this disclosure can use the current existing liquid-electrolyte packaging machine and technology for producing the gel polymer state electrolyte lithium batteries, so that the mass production of the gel polymer state electrolyte lithium batteries can be rapidly carried out, the production cost thereof can be greatly reduced, and the safety thereof can be substantially increased.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A method for fabricating a composite gel polymer electrolyte lithium battery structure, comprising the steps of:
   (a) providing at least one electrolyte film, wherein the at least one electrolyte film is consisted of sulfolane and/or propylene carbonate (PC), a lithium salt material, a solid-state polymer material and fire-retardant additives;
   (b) adhering a separator to the at least one electrolyte film so as to form an electrolyte film component; and
   (c) infiltrating electrolytes of the at least one electrolyte film into the separator till the separator is turned into a transparent state, and then adhering a positive electrode and a negative electrode onto two opposite surfaces of the electrolyte film component, respectively.

2. The method for fabricating a composite gel polymer electrolyte lithium battery structure of claim 1, wherein, after the separator and the at least one electrolyte film are adhered together in the step (b), the separator and the at least one electrolyte film are stood still or heated so as to allow the electrolytes to infiltrate the separator, and the step (c) is performed after the separator reaches the transparent state.

3. The method for fabricating a composite gel polymer electrolyte lithium battery structure of claim 1, wherein the at least one electrolyte film is formed by two electrolyte films, the separator has two opposite surfaces, and each of the two opposite surfaces is adhered with corresponding one of the two electrolyte films.

4. The method for fabricating a composite gel polymer electrolyte lithium battery structure of claim 1, wherein the electrolyte film component is formed by adhering one said separator to one said electrolyte film.

5. The method for fabricating a composite gel polymer electrolyte lithium battery structure of claim 1, further including a method for fabricating the at least one electrolyte film, wherein the method for fabricating the at least one electrolyte film includes the steps of:
   (a1) mixing the sulfolane and/or the propylene carbonate and the lithium salt material to form a first solution under a temperature of 0~40° C.;
   (b1) adding the solid-state polymer material into the first solution, and raising the temperature to 130~150° C. so as to form a second solution, wherein the solid-state polymer material shares a weight percentage of 6%~40% in the total weight of the second solution; and
   (c1) adding the fire-retardant additives into the second solution so as to form a third solution, wherein the fire-retardant additives share a weight percentage of 0.1%~50% in the total weight of the third solution.

6. The method for fabricating a composite gel polymer electrolyte lithium battery structure of claim 1, wherein the lithium salt material is made of one or a combination of lithium perchlorate ($LiClO_4$), lithium bis(oxalate) borate (LiBOB), lithium tetrafluoroborate ($LiBF_4$), bis(trifluoromethane) sulfonimide lithium salt (LiTFSI) and lithium bis(fluorosulfonyl) imide (LiFSI).

7. The method for fabricating a composite gel polymer electrolyte lithium battery structure of claim 1, wherein the solid-state polymer material is polyacrylonitrile (PAN).

8. The method for fabricating a composite gel polymer electrolyte lithium battery structure of claim 1, wherein the fire-retardant additives are one or a combination of silicon oxide, lithium-containing sulfur oxide, lithium-containing sulfur tin oxide, lithium-containing sulfide, lithium-containing oxide, trimethyl phosphate (TMP), trimethyl phosphite (TMPI) and a core-shell metal oxide.

9. The method for fabricating a composite gel polymer electrolyte lithium battery structure of claim 8, wherein the core-shell metal oxide fire-retardant additives have a particle size of 10 nm~1 μm.

10. The method for fabricating a composite gel polymer electrolyte lithium battery structure of claim 1, wherein the electrolyte film has a thickness of 30~200 μm.

11. The method for fabricating a composite gel polymer electrolyte lithium battery structure of claim 1, wherein the sulfolane and/or the propylene carbonate can share a weight percentage of 90%~50% in the total solution weight, while the lithium salt material shares a weight percentage of 5%~20% in the total solution weight.

12. The method for fabricating a composite gel polymer electrolyte lithium battery structure of claim 1, further including a step (d) of disposing a bottom cover and a top cover exterior to the positive electrode and the negative electrode, respectively, so as to sandwich the positive electrode, the electrolyte film component and the negative electrode between the top cover and the bottom cover.

13. The method for fabricating a composite gel polymer electrolyte lithium battery structure of claim 12, wherein each of the bottom cover and the top cover is made of stainless steel, the positive electrode is made of one or a combination of $LiCo_xNi_yMnO_2$ (NCM), $LiFePO_4$, $LiCoO_2$, $LiMn_2O_4$, $LiNiCoAlO_2$ and $Li_xS_y$, and the negative electrode is made of one or a combination of Li, meso-carbon microbeads (MCMB), carbon nanotube (CNT), graphene, silicon/graphite composite, graphite and $Li_4Ti_5O_{12}$.

* * * * *